United States Patent
Smith et al.

(10) Patent No.: US 10,171,309 B1
(45) Date of Patent: Jan. 1, 2019

(54) TOPOLOGY SERVICE

(71) Applicant: EMC IP Holding Company LLC, Hopkinton, MA (US)

(72) Inventors: Erik P. Smith, Douglas, MA (US); Alan Rajapa, North Smithfield, RI (US); Jean E. Pierre, Brockton, MA (US); Massarrah Tannous, Milford, MA (US); Mark Lippitt, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 150 days.

(21) Appl. No.: 15/389,903

(22) Filed: Dec. 23, 2016

(51) Int. Cl.
*H04L 12/24* (2006.01)
*G06F 17/30* (2006.01)

(52) U.S. Cl.
CPC ........ *H04L 41/12* (2013.01); *G06F 17/30477* (2013.01); *H04L 41/24* (2013.01)

(58) Field of Classification Search
CPC ....... H04L 41/12; H04L 67/10; H04L 5/0032; H04L 67/1029; G06F 17/30339; G06F 17/30377; G06F 9/455; G06F 9/50
See application file for complete search history.

(56) References Cited

U.S. PATENT DOCUMENTS

| | | | |
|---|---|---|---|
| 10,027,596 B1 * | 7/2018 | Harwood | H04L 47/70 |
| 2018/0027376 A1 * | 1/2018 | Kumar | H03M 7/40 |
| | | | 398/25 |
| 2018/0205392 A1 * | 7/2018 | Gopal | H03M 7/40 |

* cited by examiner

*Primary Examiner* — Kim T Nguyen
(74) *Attorney, Agent, or Firm* — Muirhead and Saturnelli, LLC

(57) ABSTRACT

A topology service may include a topology database and topology service interface used by clients to query the topology database. The topology database may describe a topology of resources of an infrastructure that may include racks of resources such as network, compute and storage resources. The topology database may be populated using discovery information returned as a result of issuing discovery requests to switches. The discovery information may identify connectivity between switches and other resources. The discovery information may be processed to determine assigned switch roles and additional derived information such as regarding instances of topological entities in the infrastructure. The derived information may identify instances of racks, rows and data centers in the infrastructure. The topology database may identify particular resources included in the different racks, rows, and data centers as well as connectivity between resources and communication capabilities of resource interfaces.

20 Claims, 11 Drawing Sheets

TOPOLOGY SERVICE

BACKGROUND

Technical Field

This application generally relates to a topology service.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell Inc. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to, and/or retrieve data from, a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of the invention is a method of creating and using a topology database comprising: performing first processing that obtains first information describing a topology of resources of an infrastructure comprising racks, wherein said resources include network resources and other resources connected to the network resources, wherein the network resources include a plurality of switches, and the other resources include compute resources and storage resources connected to the network resources; determining, using the first information, sets of the resources included in the racks, wherein each of the sets denotes a portion of the resources included in a different one of the racks, wherein each of the sets includes a pair of the plurality of switches, wherein the pair includes two switches that are leaf switches and each of the two switches of the pair is connected to the other switch of the pair; populating the topology database with topology information including the first information and second information, wherein the second information identifies, for each of the racks, a different one of the sets denoting a portion of the resources included in said each rack; and querying the topology database. A first of the sets may denote a first portion of the resources included in a first rack of the racks, wherein the first set may include a first pair of the plurality of switches, and wherein the first pair may include two switches that are leaf switches. Each switch of the first pair may be connected to the other switch of the first pair, and the first portion of the resources may include any of: at least one compute resource connected to the first pair of the plurality of switches, and at least one storage resource connected to the first pair of the plurality of switches. The topology database may be included in a topology service and querying may include issuing a first query to the topology database in accordance with a database interface. The first query may be issued by a controller to the topology service and the first query may include requesting placement information regarding a physical location of one or more of the resources in the infrastructure. The first query may include requesting information including any of: identifying one or more of the resources included in a same one of the racks, and identifying two or more of the resources each in a different one of the racks. The method may include: determining a first portion of the plurality of switches are leaf switches; and determining a second portion of the plurality of switches are spine switches, wherein said populating includes storing additional information in the topology database denoting each switch of the first portion is a leaf switch and each switch of the second portion is a spine switch. Populating may include storing information in the topology database identifying which of the resources are included in a row comprising at least two of the racks, and the topology database may denote that the row includes a first set of the plurality of racks and each rack of the row may be connected to each spine switch of the row. The topology database may denote that each leaf switch of the row is connected to each spine switch of the row, and may denote that each leaf switch of the row is included in a rack of the first set of the plurality of racks. The row may be a first row and the topology database may denote that the first row includes a first set of spine switches, the first set of the plurality of racks, and a plurality of border leaf switches. The topology database may denote that the plurality of border leaf switches are connected to each spine switch of the first set of spine switches and that the plurality of border leaf switches may be connected to a second plurality of border leaf switches of a second row including at least two of the racks. The topology database may denote a second row including a second set of the plurality of racks and a second set of spine switches, and the topology database may denote that the second plurality of border leaf switches are connected to each spine switch of the second set of spine switches. The topology database may denote that the plurality of border leaf switches includes a first pair of border leaf switches and each border leaf switch of the first pair may be connected to the other border leaf switch of the first pair. The topology database may denote the second plurality of border leaf switches includes a second pair of border leaf switches and each border leaf switch of the second pair may be connected to the other border leaf switch of the second pair. The topology database may denote that the first row and the second row are included in a first data center. The topology database may include interface information describing communication interfaces of the resources. The interface information for a communication interface for a first of the resources may include any of: an internet address of the communication interface of the first resource, a communications protocol used to communicate with the communication interface. The first processing may include performing discovery processing and issuing a plurality of commands to the plurality of switches. The plurality of commands may request that the plurality of switches return information identifying which of the resources are connected to each of the plurality of switches.

In accordance with another aspect of techniques herein is a system comprising: a processor; and a memory comprising code stored thereon that, when executed, performs a method of creating and using a topology database comprising: performing first processing that obtains first information describing a topology of resources of an infrastructure comprising racks, wherein said resources include network resources and other resources connected to the network resources, wherein the network resources include a plurality of switches, and the other resources include compute resources and storage resources connected to the network resources; determining, using the first information, sets of the resources included in the racks, wherein each of the sets denotes a portion of the resources included in a different one of the racks, wherein each of the sets includes a pair of the plurality of switches, wherein the pair includes two switches that are leaf switches and each of the two switches of the pair is connected to the other switch of the pair; populating the topology database with topology information including the first information and second information, wherein the second information identifies, for each of the racks, a different one of the sets denoting a portion of the resources included in said each rack; and querying the topology database.

In accordance with another aspect of techniques herein is a computer readable medium comprising code stored thereon that, when executed, performs a method of creating and using a topology database comprising: performing first processing that obtains first information describing a topology of resources of an infrastructure comprising racks, wherein said resources include network resources and other resources connected to the network resources, wherein the network resources include a plurality of switches, and the other resources include compute resources and storage resources connected to the network resources; determining, using the first information, sets of the resources included in the racks, wherein each of the sets denotes a portion of the resources included in a different one of the racks, wherein each of the sets includes a pair of the plurality of switches, wherein the pair includes two switches that are leaf switches and each of the two switches of the pair is connected to the other switch of the pair; populating the topology database with topology information including the first information and second information, wherein the second information identifies, for each of the racks, a different one of the sets denoting a portion of the resources included in said each rack; and querying the topology database.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
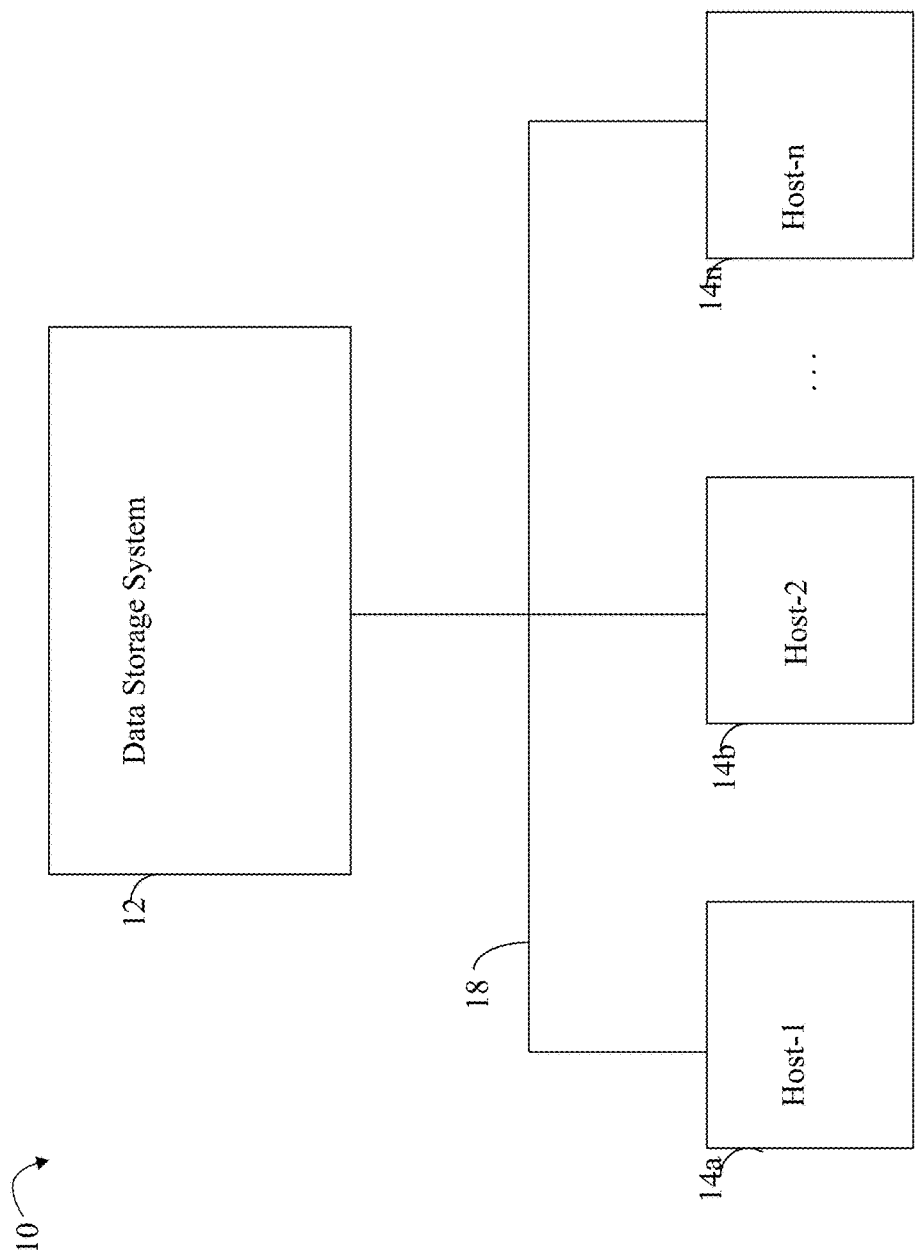
FIGS. 1, 2, 3, 4, 5 and 6 are examples of components that may be included in an embodiment utilizing techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as a Symmetrix® VMAX® data storage system, as well one or more other data storage systems as may vary with the embodiment.

Figure 2:
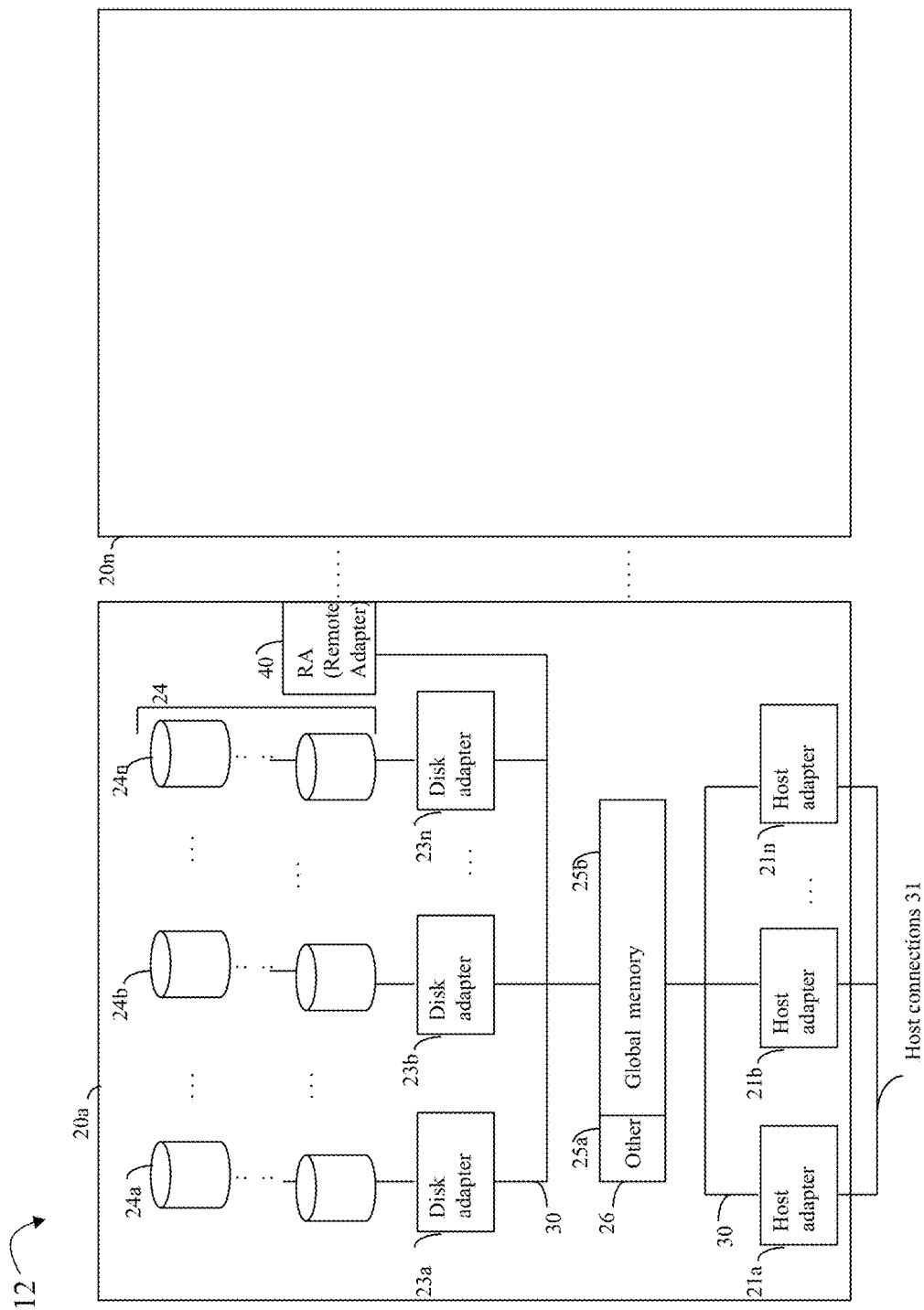

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices (e.g., non-volatile storage). Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2).

It should be noted that the particular architecture of a data storage system such as described herein is merely illustrative of one such architecture that may be used in connection with techniques herein. Those skilled in the art will appreciate that techniques herein may be used with any suitable data storage system.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

Embodiments in accordance with techniques herein may be include a physical data storage system and its physical components (e.g., physical hardware for each HA, DA, HA port and the like). In at least one embodiment in accordance with techniques, the data storage system may include one or more emulated or virtualized components (e.g., emulated or virtualized ports, emulated or virtualized DAs or HAs).

In at least one embodiment in accordance with techniques herein, functionality and processing performed by components such as the hosts and data storage system of FIG. 1 and others may be provided in one or more hyper-converged rack-scale engineered systems, such as the VxRack™ System 1000 by Dell Inc. Such a system may be referred to herein as a rack denoting an equipment rack that is a converged infrastructure collapsing compute, network and storage resources into a single system. For example, rather than have individual host systems running applications, an embodiment in accordance with techniques herein may use a rack system with compute nodes. The compute nodes may include processors that run the applications in virtualized environments, such as executing the applications in the context of virtual machines (VMs) running on processors of the compute nodes. In a similar manner, other nodes of the rack may perform processing and services typically performed by a data storage system, such as by FAs, DAs, and the like, in a data storage array. Rack systems, such as those of the VxRack™ family, may be used in deploying Infrastructure-as-a-Service and/or Private Cloud architectures with network, compute and storage resources managed as a single system.

Described in following paragraphs are techniques that may be used in connection providing a topology service that may be used in connection with deploying an infrastructure, such as one or more rack systems. An embodiment of a topology service in accordance with techniques herein may describe the topology of the infrastructure in a topology database and provide an interface for use in querying the topology database. For example, other software layers or components, such as an orchestration layer or controller described in more detail elsewhere herein, may use the topology service in connection with selecting various resources (e.g., compute, network, and storage) for provisioning in connection with different workflows or tasks. The topology service may be used as part of an infrastructure deployment service, for example, to determine the physical location (e.g., physical location in the infrastructure or rack(s)) and various attributes or capabilities of compute, network and storage resources in a particular infrastructure, such as including one or more rack systems. In this manner, one use of the topology service described in more detail herein is in resource provisioning for different tasks or workflows having different goals or selection criteria for selecting particular resource(s). Example uses and systems are described in more detail in following paragraphs.

In at least one embodiment as described in following examples, the rack systems may be based on a spine-leaf network topology such as a Clos network-based spine-and-leaf architecture.

Figure 3:
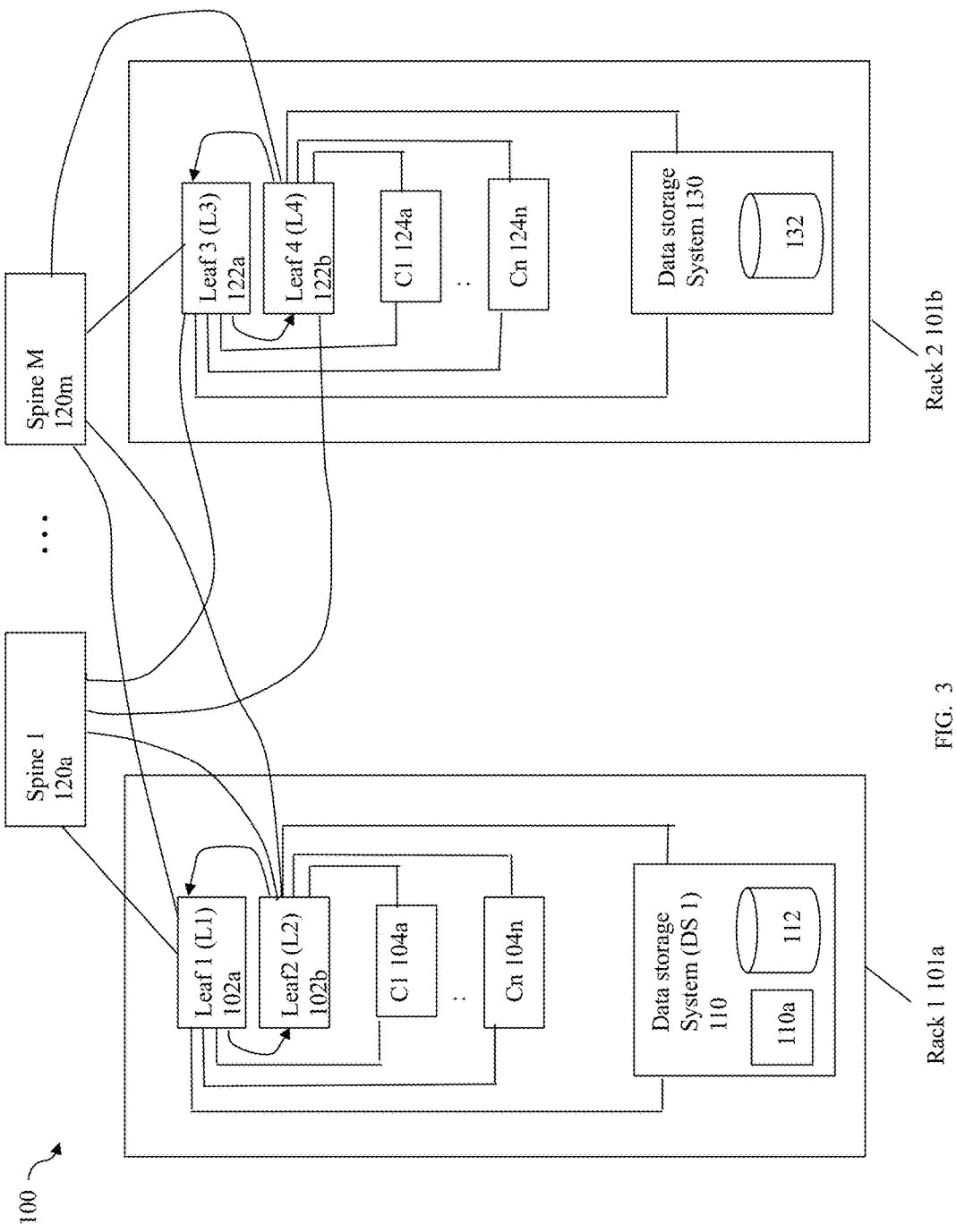

Referring to FIG. 3, shown is an example illustrating components that may be used in an embodiment in accordance with techniques herein. The example 100 illustrates an infrastructure including two racks 101a-b for simplicity although more generally, the infrastructure may include any suitable number of racks. The infrastructure of 100 may be in accordance with a leaf-spine network topology. Rack 1 101a includes compute, network and storage resources. In particular, rack 101a includes leaf switches 102a-b, compute nodes 104a-n and data storage system 110. In this example 100, the data storage system 110 may be implemented as a software defined data storage system using compute nodes 110a and data storage 112. Element 112 may generally represent storage resources, such as physical storage devices (e.g., non-volatile storage). In such an embodiment, various components (e.g., DAs, FAs) and services typically provided by a data storage system (as described herein) may be provided using physical data storage 112 and software such as virtualized components (e.g., implemented using software executed on VMs on compute nodes 110a). As described in more detail below, the storage 112 may be accessible through compute nodes 110a whereby the storage 112 may generally denote physical storage locally accessible to each of the compute nodes 110a. Generally, different components of the rack 101a may be connected to both of the leaf switches 102a-b. For example, each of the compute nodes 104a-n and 110a may be connected to each of the leaf switches 102a-b. Storage resources 112, which are locally accessible storage to compute nodes 110a, may thus be accessible through connectivity to such compute nodes 110a. In this example, the topology of 100 may be characterized by having each compute node of the rack 101a connected to each/every leaf switch 102a-b of the rack 101a. Thus, within the rack 101a, resources or components of the rack, such as compute and storage resources, may have connectivity to both of the leaf switches 102a-b. Rack 2

101b may include components and resources similar to that as described and illustrated for rack 1 101a.

In this three stage Clos architecture illustrated in FIG. 3, every lower-tier leaf switch (leaf layer) is connected to each of the top-tier switches (spine layer) in a full-mesh topology. The leaf layer consists of access switches, such as leaf switches 102a-b and 122a-b) that connect to components (e.g., compute nodes 104a-n and 110a) of the rack 101a. The spine layer in this example includes spine switches 120a-m and may be characterized as the backbone of the network and is responsible for interconnecting all leaf switches 102a-b, 122a-b. As illustrated, every one of the leaf switches 102a-b, 122a-b connects to every one of the spine switches 120a-m in the fabric.

For fault tolerant purposes, multiple switches, such as multiple leaf switches, may be configured to form a group such that a client connecting to the group may treat all switches of the group as a single logical switch over a single link having a single address (e.g., MAC address). In at least one embodiment, a pair of leaf switches may be configured as an MC-LAG or MLAG (Multi-Chassis Link Aggregation Group) which is a type of link aggregation group (LAG) with constituent ports that terminate on separate chassis, primarily for the purpose of providing redundancy in the event one of the chassis (e.g., switches) fails. A LAG (Link Aggregation Group) may be characterized in one aspect as a method of inverse multiplexing over multiple Ethernet links thereby increasing bandwidth and providing redundancy. A LAG is defined, for example, by the IEEE 802.1AX-2008 standard, which allows one or more links to be aggregated together to form a LAG such that a MAC client can treat the LAG as if it were a single link. This may be achieved by the LAG using a single MAC address for all the switch ports in the LAG group. In this manner, a pair of leaf switches, such as 102a-b and also 122a-b, may be interconnected and used as one logical switch. It should be noted that in this particular topology, each rack may include a pair of leaf switches which form an MLAG and each compute node of the rack may have connectivity to each/every leaf switch of the same rack. More generally, an embodiment in accordance with techniques herein may include any suitable number of multiple leaf switches in a rack configured as an MLAG of leaf switches having connectivity to each of the compute nodes in the rack.

It should be noted that also more generally, the topology of a particular infrastructure in accordance with techniques herein may be characterized by having other devices, components or resources within a single rack connected to each of the leaf switches of that single rack. In an infrastructure, spine switches may be characterized by having each/every leaf switch of the infrastructure connected directly to each/every spine switch. Thus, spine switches provide for connectivity between the different racks 101a-b.

In at least one embodiment, storage resources from multiple data storage systems, such as 112 and 132 from arrays 110 and 130, may be abstracted into a single storage pool managed and under the control of a software-defined storage offering, such as the ViPR® storage offering from Dell Inc. The ViPR® storage offering includes components, such as the ViPR® Controller that provides automated provisioning of storage services from the storage pool formed from storage resources 112, 132, of multiple storage systems 110, 130. Thus, the ViPR® Controller is an example of a software controller that may be used in provisioning storage, for example, for use by a VM. For example, a user may desire to provision resources for use by a VM in the infrastructure 100. The resource provisioning may include selecting a compute node, such as one of compute nodes 104a-n, 124a-n, upon which the VM will execute in a virtualized environment. The resource provisioning may also include selecting storage resources, such as selecting one of the data storage systems 110, 130, from which storage will be provisioned for use by the VM. In connection with selecting the particular compute node and data storage system used for the VM provisioning request, connectivity between the storage resource (e.g., data storage system selected) and the compute node (e.g., upon which the VM is to execute) is required. Additionally, one or more criteria may be considered in connection with selecting the particular compute node and storage resources for the provisioning request for the VM being deployed. For example, such criteria may include selecting a compute node and storage resources for use by the VM which a goal of minimizing latency between the executing VM and its storage resource. Thus, it is important to know where (e.g., physical location) in the infrastructure each of the compute and storage resources, such as data storage systems, are located. For example, such location information may include information identifying in which rack the different available compute and storage resources are located. It may be desirable to select a compute node and storage resources for the VM being provisioned whereby the compute node and storage resources are physically located in the same rack. In this manner, the VM may access its provisioned storage using leaf switches of the rack without requiring communication through any of the spine switches 120a-m. Such a selection may be based on criteria which seeks to minimize latency and also prevent or minimize consuming inter-rack bandwidth of the spine switches 120a-m. Thus, the ViPR® controller may use the topology service as described in more detail below in accordance with techniques herein which may provide topology information such as regarding physical location in the infrastructure of available storage resources and compute nodes. For example, the controller may select one of the data storage systems 110, 130 having sufficient storage resources available for the VM and then select from available compute nodes in the same rack as the selected storage resources/data storage system. For example, assume that only storage system 110 but not 130 has sufficient available storage for the VM being provisioned and compute nodes 104a, 104n (of rack 101a) and compute node 124a (of rack 101b) have available processing capacity for the VM. Thus, storage resources from 110 may be selected and additionally either compute node 104a or 104n may be selected (rather than 124a) since 104a and 104n are in the same rack 101a as 110. In an embodiment in accordance with techniques herein, the topology service may include a database storing topology information about the infrastructure resources such as the particular rack and other physical location or infrastructure placement information of such resources. The topology service may be queried, for example, to return a list of compute nodes in the same rack as the selected storage resource 110.

As another example in which the topology service described herein may be used, consider an embodiment of an infrastructure including multiple racks as illustrated in FIG. 3 where another software defined storage product such as Dell EMC™ ScaleIO® offered by Dell Inc. may be utilized. ScaleIO® generally creates a server-based SAN from direct attached storage that is locally accessible to different compute nodes of the racks whereby such storage resources may be combined into virtual or logical storage pool from which storage may be provisioned. With ScaleIO®, data servers provide local storage as part of the collective logical storage pool whereby such data servers provide for serving data to data clients or consumers of the storage pool. ScaleIO virtualizes the internal node's direct-attached storage into a shared network-based block storage similar to SAN storage.

Figure 4:
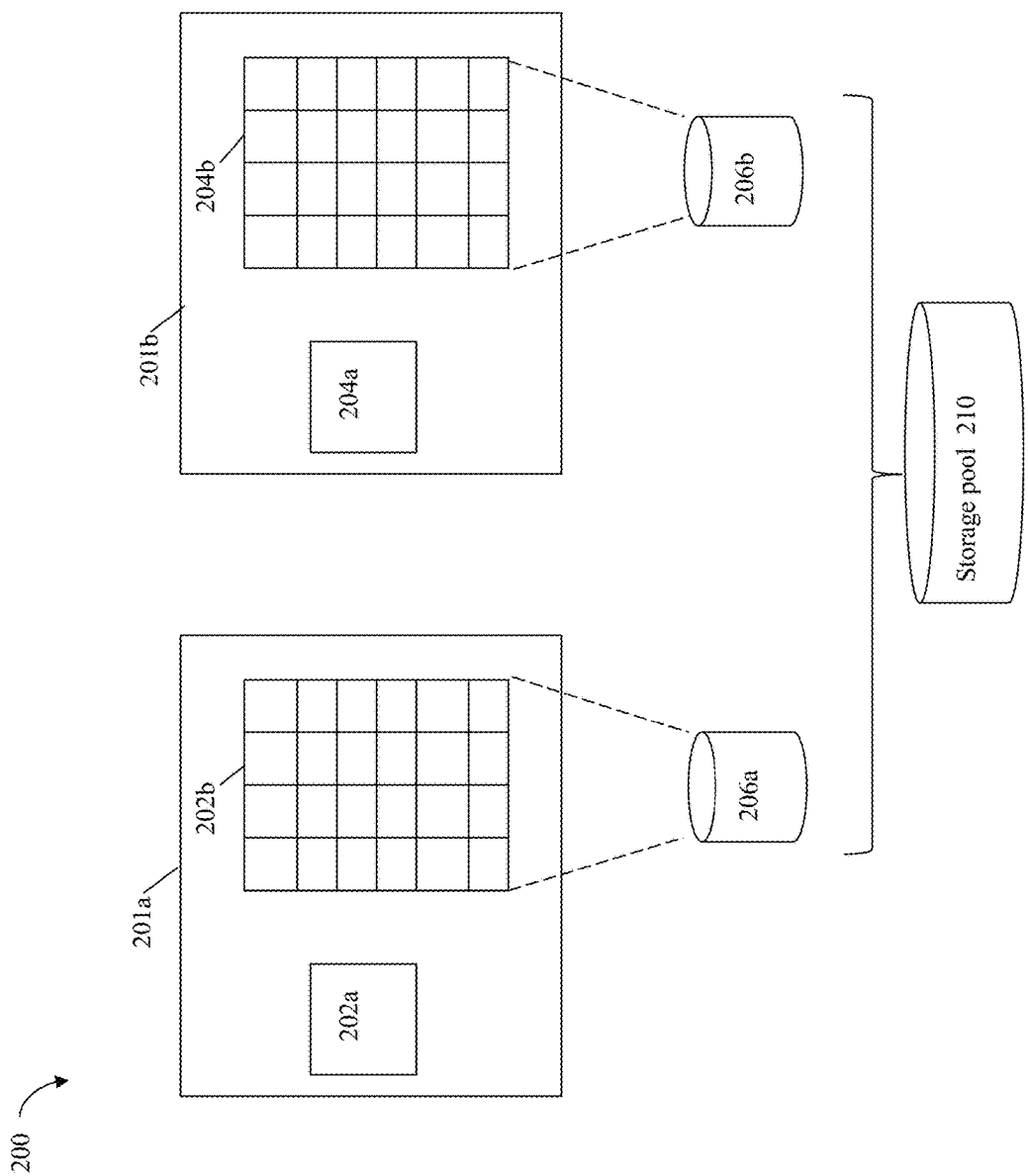

To further illustrate, reference is made to example 200 of FIG. 4. In the example 200, elements 201a-b may each denote resources of a different rack (such as described in FIG. 3). In at least one embodiment, the racks used in connection with ScaleIO® may employ a leaf-spine network topology. Element 201a includes 202b representing the local attached storage of a first portion of compute nodes in a first rack. Element 201b includes 204b representing local attached storage of a second portion of compute nodes from a second rack. The storage resources of 202b and 204b may be combined and configured using ScaleIO®. Element 206a may collectively represent the local attached storage of compute nodes of the first portion of the first rack, and element 206b may collectively represent the local attached storage of compute nodes of the second portion of the second rack, whereby storage resources 206a and 206b may be collectively combined and configured as a single storage pool 210 from which storage may be provisioned. Element 202a denotes compute nodes of the first rack which are data clients or consumers of the storage pool 210 and element 204a denotes compute nodes of the second rack which are data clients or consumers of the storage pool 210. Thus, any data client from 202a and 204a may have storage provisioned from the storage pool 210, and thus, from storage resources locally accessible to compute nodes of the two racks. In at least one embodiment where the infrastructure is a hyper-converged environment with multiple racks, each compute node may be a data server as well as a data client, and each compute node may be running one or more VMs. Thus, each data server owns local storage 202b, 204b that contributes to the storage pool 210. Local storage may include entire storage devices (e.g., disks), disk partitions, and even files where the role of the data server is to actually perform the backend I/O operations (e.g., read from/write to provisioned local storage of the data server) as requested by a data consumer or client of such storage.

The topology service described herein may be used in connection with selecting and configuring different compute nodes for use with the storage pool. In at least one embodiment in accordance with techniques herein using ScaleIO®, a protection domain may be defined where a protection domain includes a set of data servers and where each data server may belong to only a single protection domain. Compute nodes of a single protection domain may provide storage for the single pool 210. In connection with configuring the protection domain, it may be desirable to select/distribute data servers on compute nodes from different racks rather than, for example, have all data servers on compute nodes of the same rack. For example, if all compute nodes in a single configured protection domain are in the same rack J and rack J becomes unavailable (e.g., entire rack loses connectivity to network/fabric/other racks or otherwise is inaccessible or unavailable), then no storage is available in the protection domain and thus the storage pool. Thus, it may be desirable to configure a protection domain and its storage pool from compute nodes distributed across multiple racks. In this manner, the topology service as described herein may be used in connection with selection of compute nodes forming the protection domain whereby such compute nodes provide storage for the storage pool 210. For example, the topology service may be queried to select compute nodes distributed, as evenly as possible, across multiple racks and ensure, for example, that all selected nodes forming the protection domain are not included in the same rack. Thus, the foregoing is another example where physical location information regarding components or resources of the infrastructure (e.g, where different resources are located relative to one another in the infrastructure) may be used in connection with a provisioning request.

Figure 5:
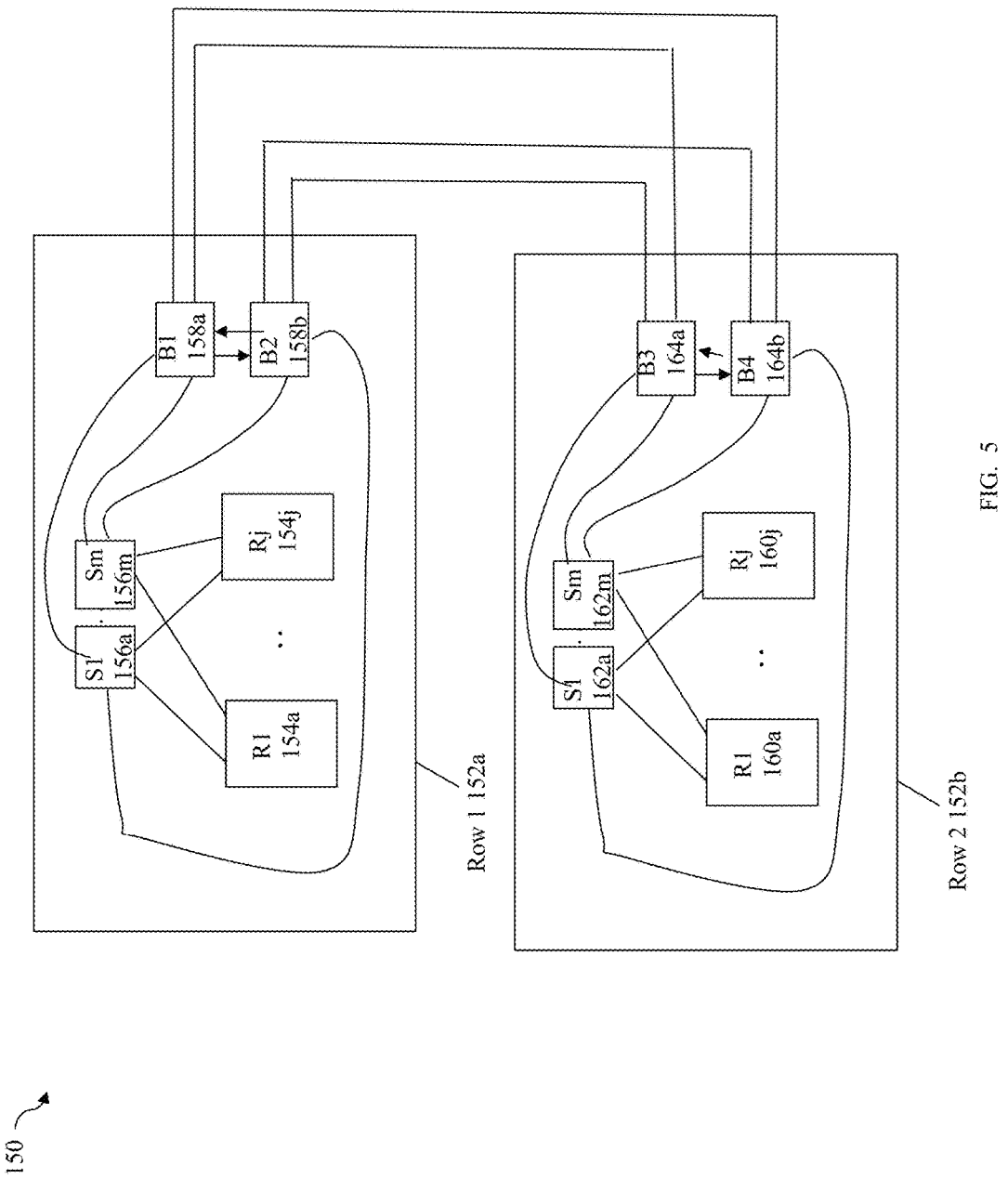

Before proceeding with additional details regarding the topology service, reference is made to FIG. 5 illustrating additional network topology concepts of an infrastructure where such concepts may also be described in the topology service in an embodiment in accordance with techniques herein. The example 150 illustrates rows of racks that may be included in a single data center. An infrastructure in accordance with techniques herein may include a single or multiple such data centers.

Element 152a may represent a first row 1 of racks and element 152b may represent a second row 2 of racks in the data center. Rows 152a-b may be as described, for example, in connection with FIG. 3 and elsewhere herein with the addition of border leaf switches (also referred to herein as simply border switches) 158a-b, 164a-b. Row 152a includes racks R1 154a-Rj 154j, spine switches 156a-m and border switches 158a-b. Racks R1 154a-Rj 154j and spine switches 156a-m may be as described in FIG. 3. Additionally, the example 150 further includes border switches 158a-b connected to spine switches 156a-m of the same row 152a. Generally, border switches 158a-b may be used to interconnect different rows of racks (e.g., inter-rack connections/communications). Within a single row 152a, each/every one of the border switches 158a-b may be connected to each/every one of the spine switches 156a-m. Additionally, the border switches 158a-b may be connected to other border switches (e.g., 164a-b) of other rows (e.g., row 2 152b) thereby providing connectivity between rows (e.g., between rows 152a-b). In at least one embodiment in accordance with techniques herein, interconnections between different pairs of rows in a data center may vary. For example, it may be that each row is not connected to every other row in the data center. Additionally, an embodiment may also connect two or more rows together based on other topologies for which processing may be performed to recognize as connectivity between rows. For example, an embodiment in accordance with techniques herein may connect multiple rows together using a 5 stage clos topology. In a manner similar to that as described herein for the particular topology of FIG. 5 for row connectivity, techniques herein may include performing processing to recognize characteristics of different topologies for interconnected rows.

Multiple border switches may be configured as an MLAG in a manner similar to that as described herein with respect to pairs of leaf nodes 102a-b within a single rack. For example, a pair of border switches 158a-b may be configured as an MLAG.

Row 2 152b includes racks R1 160a-Rj 160j, spine switches 162a-m and border leaf switches or border switches 164a-b. Generally, the switches 162a-m, 164a-b and racks 160a-j may be configured and connected in a manner similar to that as described for row 1 152a. In this example, each of the border switches 158a-b of row 1 152a may be connected (e.g., such as via a local area network) to each of the border switches 164a-b of row 2 152b.

The example 150 includes only two rows of racks and other components for simplicity. More generally, a data center may include any suitable number of rows with connectivity provided between different selected rows through border switches of the different rows (e.g., or other topology used for connectivity between rows such as the 5 stage clos topology noted above or other suitable topology known in the art).

An embodiment of the topology service described in more detail below may include topology information regarding connectivity between different rows, what rows and other components/resources are included in a single data center, and the like. For example, consider a data center including 3 rows (e.g., one more row of components in addition to that illustrated in FIG. 5), where row 1 is connected to row 2, and row 2 is connected to row 3, but row 1 is not connected to row 3. The topology service may accordingly show such connectivity between rows 1 and 2, and between rows 2 and 3. Such connectivity information and physical location or placement of components in different rows may be useful, for example, for queries similar to that as described above in selecting components or resources of different rows with a goal of minimum latency (e.g., minimize spine latency and bandwidth consumed). The topology service may be queried to determine physical location or placement in the infrastructure having the required connectivity with minimum latency. For example, rather than select components in rows 1 and 3 for provisioning, information may be obtained from the topology service which results in selecting rows 1 and 2, or rows 2 and 3, rather than rows 1 and 3 (e.g., since there is no direct connection between rows 1 and 3, communications from row 1 to row 3 may be accomplished indirectly through row 2 which may have a higher latency and higher spine switch bandwidth consumption than, for example, communications directly between rows 1 and 2, or rows 2 and 3).

Figure 6:
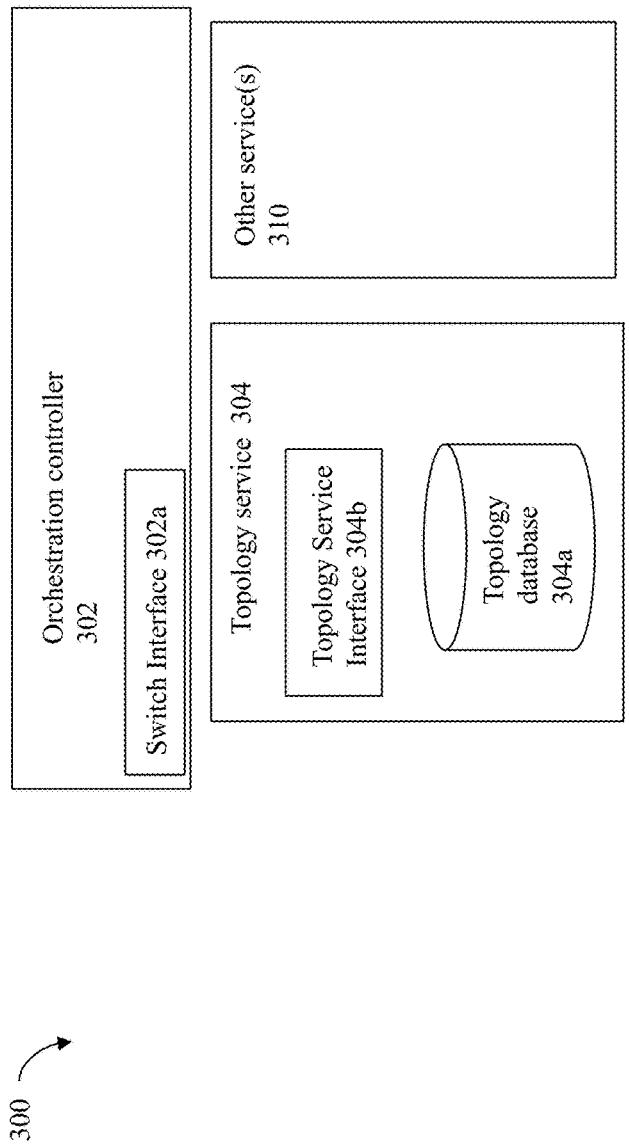

Referring to FIG. 6, shown is an example of different software components that may be included in an embodiment in accordance with techniques herein. The example 300 includes an orchestration controller 302, topology service 304 and one or more other services 310. The orchestration controller 302 may be generally characterized as a high level driver or controller embodied in software which controls the workflow or overall logic and decision-making when performing a task. The task may include one or more steps in which the controller 302 may query the topology service 304 for topology information in connection with decision-making. Examples of such queries, criteria, and decision-making are described above (e.g., for a VM being provisioned, selection of a particular compute node upon which the VM will execute and selection of storage resources/data storage system providing storage for the VM; for a storage pool and protection domain, selection of compute nodes from as many different racks as possible). The orchestration controller 302 may also obtain additional information as may be needed for a particular task from one or more other services 310. For example, such other information may include obtaining utilization information from a utilization service regarding current utilization levels of different resources (e.g., compute nodes, storage resources, network resources such as one or more switches) and possibly utilization levels for particular interfaces that may be useful in connection with selection of one or more resources for a particular provisioning request.

The topology service 304 may include a topology database 304a and topology service interface 304b. The controller 302 may communicate with the topology service 304 using the topology service interface 304b. In at least one embodiment, the topology database may be a graph database management system such as Neo4j by Neo Technology, Inc. Generally, graph databases are based on graph theory. Graph databases employ nodes, edges and properties. Nodes represent entities such as different topological entities (e.g., resources, other entities such as racks, rows, data centers). Edges are the lines that connect nodes to other nodes where edges represent the relationship between connected nodes. Meaningful patterns emerge when examining the connections and interconnections of nodes, properties, and edges. Edges are the key concept in graph databases, representing an abstraction not directly implemented in other systems. Properties are pertinent information that relate to nodes. In at least one embodiment using Neo4j, the topology service interface 304b may use a graph query language such as Cypher. More generally, the topology database 304a and topology service interface 304b may be implemented, respectively, using any suitable database technology and interface, such as a query language usable with the particular database technology. Generally, the query constructed using the interface 304b may represent one or more selection criteria for selecting information from the topology database 304a. In response to receiving a particular query, the topology service 304 may query the topology database 304a and return query results to the initiator of the query. For example, in at least one embodiment as described herein, the orchestration controller 302 may be such an initiator, client or consumer of the topology service 304.

In at least one embodiment, the topology service 304 may include a topology database 304a that includes information describing the topology of the infrastructure such as the various topological entities, connectivity between the entities, and additional information such as various attributes or characteristics of the different entities, as described herein. For example, the topology database may describe instances of the various topological entities of rows, data centers, racks, and resources (e.g., network resources such as leaf switches and border switches; compute resources such as compute nodes; and storage resources, such as a data storage system and local attached storage of compute nodes); resources included in each of the different entities (e.g., resources included in different rows, racks, data centers); and additionally connectivity between different entities. The topology database may describe various attributes or characteristics of such entities, such as a particular role associated with a switch denoting whether a switch is a leaf switch or a border switch/border leaf switch. Such additional information may also include information characterizing the different communication interfaces of the described entities of a particular infrastructure instance. For example, for a switch or compute node, the topology database may describe the number of interfaces and the communication capabilities of each such interface. For example, such information may identify the particular hardware adapter or interface, communication protocols supported by a particular interface, and the like. To further illustrate, a compute node or switch may have an interface, such as a network interface card (NIC), which is capable of communicating to another interface using one or more identified protocols. For example, one interface may communicate using a first communication protocol such as RoCE (RDMA (remote direct memory access) over converged Ethernet). A second interface may communicate using a second communication protocol such as iWARP (internet Wide Area RDMA Protocol). Generally, iWARP and RoCE are two different RDMA protocols that implement RDMA for efficient data transfer over Internet Protocol networks. While the RoCE protocol defines how to perform RDMA using Ethernet and UDP/IP frames, the iWARP protocol defines how to perform RDMA over a connection-oriented transport like the Transmission Control Protocol (TCP). Other examples of supported protocols for an interface may include FCoE (Fibre Channel over Ethernet), Infiniband™, and others known in the art.

Depending on the particular components connected through interfaces, different protocols may or may not be compatible. For example, a first compute node with a first interface supporting an RDMA protocol such as RoCE or iWARP may not be compatible with another protocol, such as FCoE supported by a second interface of a second compute node. In this manner, information regarding the network or communication interfaces and supported protocols may be stored in the topology database for use in connection with making provisioning queries and decisions. A query of the topology database may request, for example, two compute nodes in two different racks where each such compute node has an interface supporting the same protocol or compatible protocols. In at least one use case, the protocol(s) may also be specified in criteria of the query. In another use case, the query criteria may generally indicate that any protocol of the first and second interfaces are acceptable so long as the interfaces support the same communication protocol or compatible communication protocols Generally, what protocols are compatible as well as supported for particular resources, such as switches, may vary with particular aspects of each embodiment, such as may vary with switch and vendor.

The orchestration controller 302 may also include a switch interface 302*a* which communicates with the various switches (and possibly also hosts or other components) of the infrastructure to perform topology discovery. In at least one embodiment, the controller 302 may issue queries to the switches in the form of Link Layer Discovery Protocol (LLDP) requests to discover or obtain information regarding connectivity between network, compute and storage resources. As a variation, in at least one embodiment in accordance with techniques herein, the controller 302 may indirectly obtain the collected LLDP information from the switches (and hosts) where LLDP the queries or requests for this discovery information may be made, for example, using an application programming interface (API) (e.g., such as a REST (REpresentational State Transfer) API) or via requests issued in accordance with the Simple Network Management Protocol (SNMP).

As known in the art, LLDP may be characterized as a vendor-neutral link layer protocol in the Internet Protocol Suite used by network devices for providing information including device identity, capabilities, and neighbors (e.g., other devices or elements connected to a particular network device) on an IEEE 802 local area network, principally wired Ethernet. For example with reference back to FIG. 6, in at least one embodiment, the controller 302 may issue an LLDP command or request (e.g., directly or indirectly such as using an API as noted above) to leaf switches 102*a* and 102*b* in order to determine what other elements are physically connected to each of the leaf switches 102*a-b*. For example, in response to such a query, switch 102*a* may return information denoting the switch 102*a* is connected to switch 102*b*, compute nodes 104*a-n*, data storage system 110, and switches 120*a-m*.

A particular role may be associated with a switch in the infrastructure in any suitable manner. In at least one embodiment, a role such as leaf (e.g., 102*a*, 102*b*), border leaf (e.g., 158*a-b*), or spine (e.g., 120*a-m*) may be assigned to a switch, for example, by presetting at the factory when switches are manufactured, in a configuration file, and the like. As a variation or in cases where one or more switches are not assigned roles such as through presetting or via a configuration file, processing may be performed to automatically (e.g., programmatically) assign a role to a switch. In at least some embodiments, roles automatically assigned to switches may be later modified as part of the configuration process for the infrastructure. Thus, switch roles assigned to switches may be returned as part of the discovery information from LLDP commands or may be automatically assigned.

Generally, an embodiment may use any suitable algorithm or technique to assign roles to switches. As noted above, a role assigned to a switch may be factory preset by the switch manufacturer such as prior to shipping. A role may be assigned to a switch by a customer (e.g., via MAC address) as racks are being installed. A role may be assigned to a switch programmatically and the customer may be allowed to override an automatically determine switch role, if necessary. At least one embodiment may use processing described below in connection with determining a switch role in a Clos topology having MLAG'd leaves (e.g., 102*a-b* in FIG. 3 forming an MLAG). Such processing may include analyzing discovery information returned from switch query commands such as the LLDP requests noted above. In this manner, roles automatically determined may be derived from, based on, and in accordance with, the discovery information returned from the switch query commands.

Figure 7:
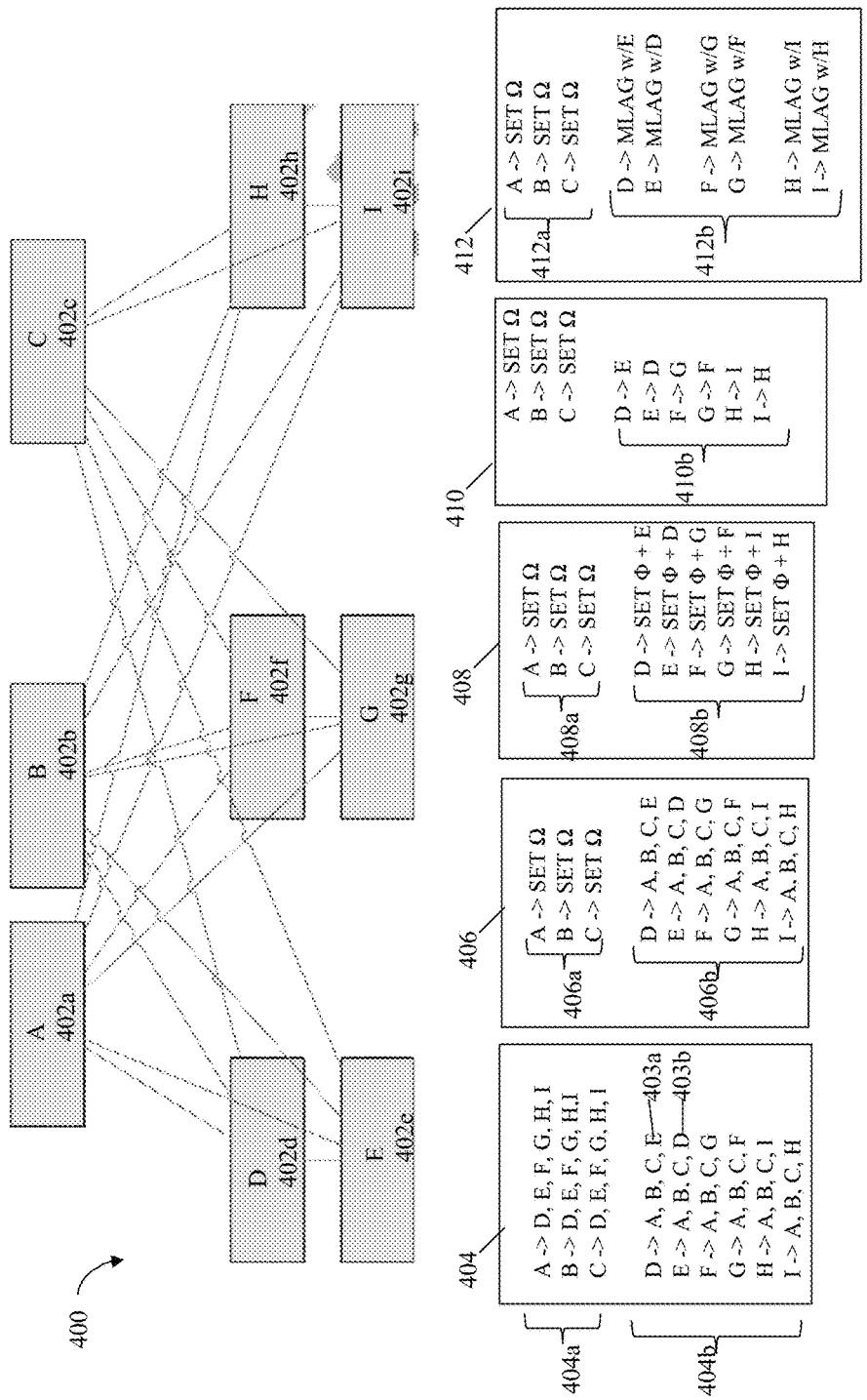
FIG. 7 is an example illustrating processing that may be performed to assign switch roles in an embodiment in accordance with techniques herein.

As described herein, each switch may provide a list of other switches it is connected to. Such discovery information may gathered via LLDP as described above. Processing may be performed, for example by a fabric IP auto-configuration service, which analyzes the discovery information to programmatically assign a role to each switch. One way in which switch roles may be assigned will now be described with reference to the example 400 of FIG. 7. Following paragraphs will describe processing performed to assign a role of leaf or spine to a switch illustrated with respect to the example 400 which includes switches A-I 402*a*-402*i*

In a first step 1, the switches may be separated into two groups where each switch of the first group (i.e., A, B and C) is connected to each switch in a second group that is a common set of other switches (i.e., D, E, F, G, H, I). Each switch of the second group (i.e., D, E, F, G, H, I) is not connected to only a common set of switches (e.g., each switch of the second group is not only connected to the same common set of switches). Element 404 illustrates the partitioning of the switches into these 2 groups where 404*a* denotes the first group comprising A, B and C; and 404*b* denotes the second group comprising D, E, F, G, H and I. For each of the switches on the left hand side (LHS) of an arrow, element 404 also lists on the right hand side (RHS) of the arrow the switches to which the switch on the LHS is connected. For example, as illustrated in 404*a*, each switch of the first group is connected only to the same set of common switches D, E, F, G, H and I. As illustrated by 404*b*, each switch of the second group is not only connected to the same common set of switches. Although each switch of the second group is connected to switches A, B, and C, each switch in the second group is additionally connected to a different switch. For example as illustrate by 403*a*, D is connected to A, B, C and also E; and as illustrated by 403*b*, E is connected to A, B and C and also D.

In a second step 2, the second group of common set of switches (e.g., D-I) that the first group (e.g., A-C) is connected to may be labeled as SET Ω. This may be represented by performing a simple substitution of "SET Ω" for each occurrence of the set of switches (D, E, F, G, H, I) on the RHS of the arrow with respect to 404. For example, each occurrence of the set of switches "(D, E, F, G, H, I)" on the RHS of the arrow in 404a is replaced with "SET Ω" whereby element 406a illustrates the result after performing such substitution.

Furthermore, each switch connected to "SET Ω" (e.g. each switch on the LHS of an arrow in 406 having "SET Ω" on the RHS) is a spine switch and is included in SET Φ. Thus, SET Φ may be the set of spine switches which includes A, B and C. Element 408b illustrates the result of performing a simple substitution of "SET Φ" for each occurrence of "A, B, C" on the LHS of an arrow in 406b.

In a third step 3, for each member in SET Ω (e.g., each of the switches D-I), remove the members of SET Φ from its list of connected members (e.g., remove "SET Φ" from the RHS of each of 408b resulting in 410b.

In a fourth step 4, for each member in SET Ω (e.g., each of the switches D-I), use the remaining switch in the list of connected members (e.g., in the RHS of the arrow) as its MLAG partner. For example, with reference 410b, each of the switches D-I is in SET S2 and each such switch has a single remaining connected member (e.g., on the RHS of the arrow) which is the switch's MLAG partner. Element 412b denotes the resulting list of leaf nodes and configured MLAG partners and element 412a lists the spine switches.

The foregoing processing may be performed to assign a role of leaf or spine to each of the switches A-I in the example 400. Additionally, consistent with other discussion herein, a leaf switch may also be a special type of leaf switch referred to herein as a border leaf switch or simply border switch. Generally, a leaf switch may be further characterized as a border leaf switch if the leaf switch connects to other leaf switches besides it's MLAG'd leaf node pair. Furthermore, a border leaf switch may be characterized as a leaf switch that connects to only spine switches and leaf switches. In this manner, automated processing may also be performed to further detect which leaf switches are border leaf switches.

An embodiment may store the particular role of each switch as an attribute or property of the switch in the topology database.

Additional information that may be derived through analysis. Such analysis may use the discovery information returned from switch query commands such as the LLDP requests noted above and may also include any additional switch role assignment that may be obtained through other means (e.g., through user configuration or assignment, through automated assignment). The additional derived information may include determining instances of the topological entities of rack, row and data center and the components or resources in each such instance. Each of the entities of rack, row and data center may have particular defining characteristics and an associated entity topology. Such analysis may include processing to recognize such defining characteristics and topology of each entity.

For example, analysis may determine derived information including a rack based on each pair of leaf switches (non-border) connected to resources such as compute nodes and/or data storage systems (or more generally data storage resources). The rack may be determined to include non-switch components connected to the leaf switches of the rack. For example, with reference to FIG. 7, leaf switches D and E may be included in a first rack and leaf switches F and G may be included in a second rack. Although not illustrated in FIG. 7, additional compute nodes may be connected to switches D and E where such compute nodes may be determined through such analysis to be included in the first rack. Similarly, although not illustrated in FIG. 7, additional compute nodes may be connected to switches F and G where such compute nodes may be determined through such analysis to be included in the second rack.

Analysis (e.g., performed using the LLDP returned discovery information and any additional switch role assignment) may also determine derived information including one or more rows such as illustrated in FIG. 5. For example, as illustrated in FIG. 5, a row may be characterized as including spine switches connected to leaf switches of different racks, and additionally determining the spine switches connect to border leaf switches in accordance with a row topology such as illustrated by 152a and 152b. Analysis may also determine derived information including a data center such as illustrated in FIG. 5. For example, as illustrated in FIG. 5, a data center may be characterized as including one or more row connected through border switches in accordance with a defined data center topology such as illustrated in FIG. 5.

Figure 8:
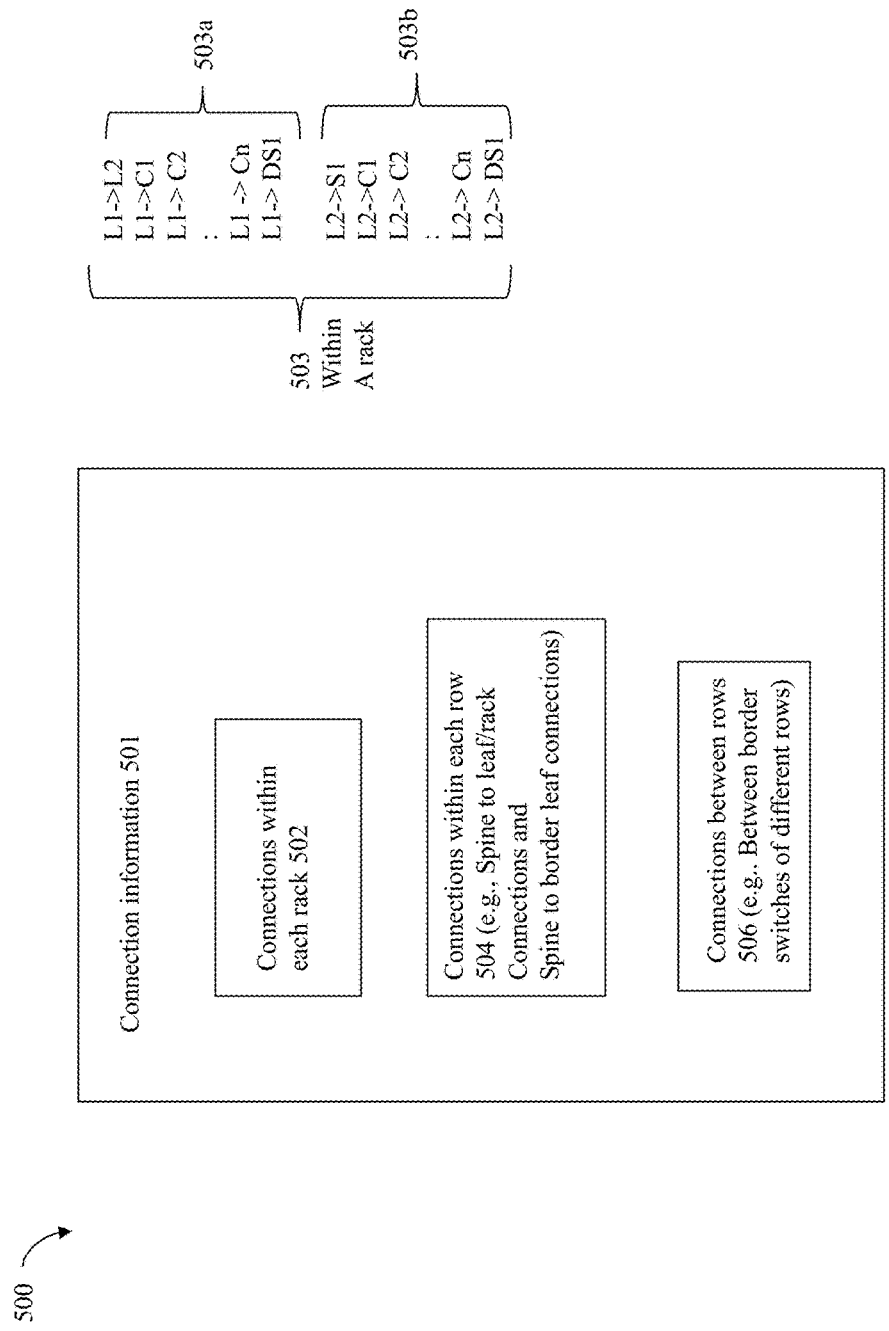
FIGS. 8, 9 and 10 describe information that may be stored in a topology database in an embodiment in accordance with techniques herein; ad

Referring to FIG. 8, shown is a representation of information that may be stored in the topology database 304a in an embodiment in accordance with techniques herein. The example 500 illustrates in more detail connection information 501 that may be stored in the topology database. The connection information 501 may describe connections between components/resources within each rack 502, connections between components/resources in each row 504, and connections between rows 506. Connection information represented by 501 may be returned by the LLDP query commands as part of discovery processing. Connection information 501 may denote connectivity between different resources or components (e.g., between compute, switch and storage resources).

Element 503 represents in more detail connection information that may be included in the topology database, for example, such as for rack 1 101a of FIG. 3. In 503, L1 denotes leaf switch 102a, L2 denotes leaf switch 102b and DS1 denotes data storage system 110. Element 503a may denote connectivity information regarding components/resources connected to switch L1 102a and element 503a may denote connectivity information regarding components/resources connected to switch L2 102b.

The connections within each row 504 may include connections between spine switches and racks (e.g., between S1 156a and racks 154a-j of FIG. 5, or more specifically connections between spine switch 120a and leaf switches 102a-b of the rack such as illustrated in FIG. 3); connections between spine switches and border leaf switches (e.g., between S1 156a and 158a-b of FIG. 5); and connections between MLAG's pairs of border leaf switches (e.g., between 158a-158b of FIG. 5)

The connections between rows 506 may include connections between border leaf switches of different rows (e.g., between 158a and 164a-164b of FIG. 5).

Figure 9:
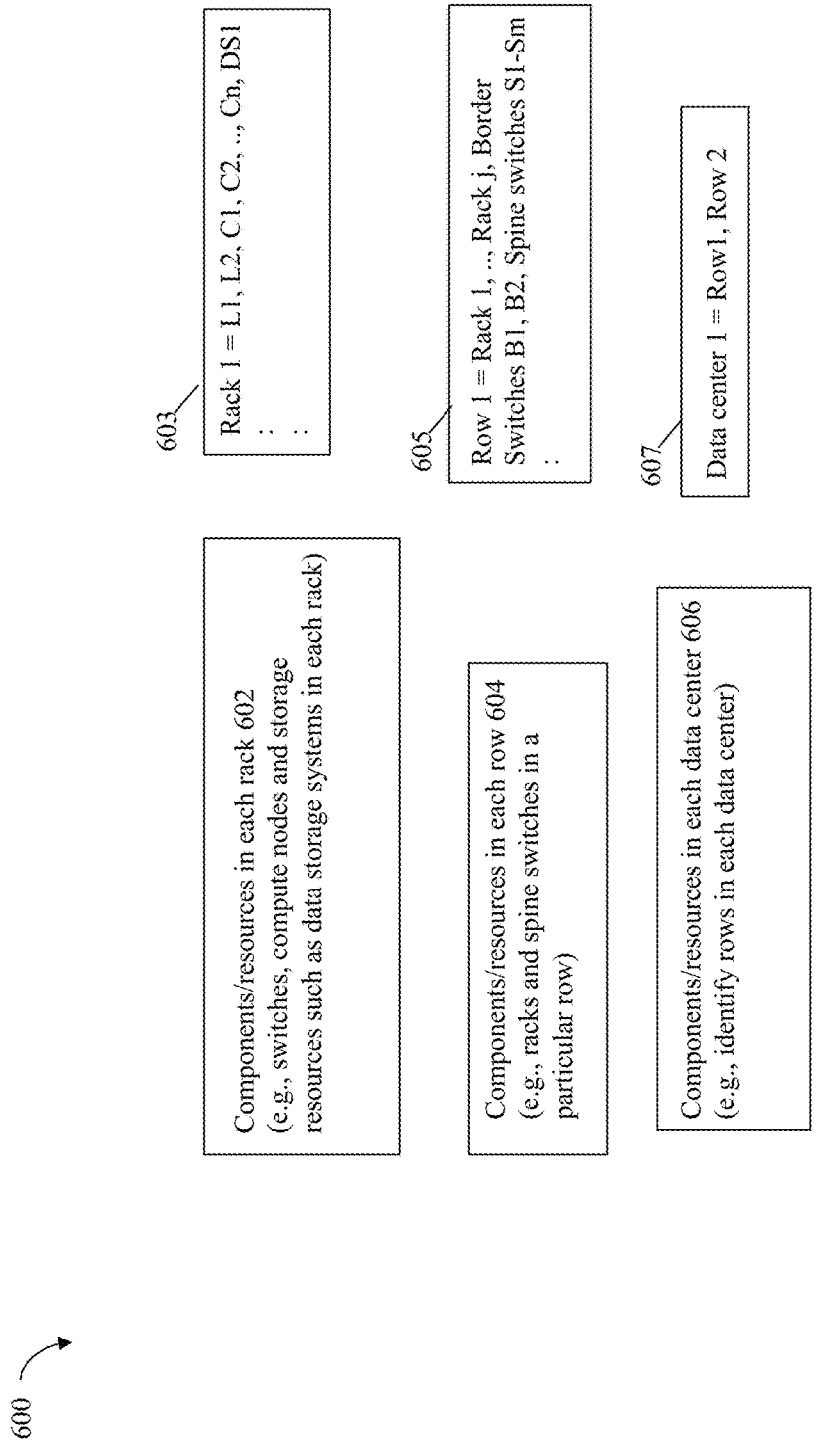

Referring to FIG. 9, shown is a representation of component/resource information that may be stored in the topology database 304a in an embodiment in accordance with techniques herein. The example 600 illustrates in more detail information detailing what components/resources are included in each instance of the different entities in the topology.

Element 602 represents that the topology database may identify the components/resources included in each rack (e.g., the switches, compute nodes, and storage resources included in each rack). To further illustrate, reference is made to rack 1 101a of FIG. 3 where 603 may represent the information included in the topology database identifying the components/resources included in rack 101a.

Element 604 represents that the topology database may identify the components/resources included in each row (e.g., the racks, spine switches and border leaf switches included in each row). To further illustrate, reference is made to row 1 152*a* of FIG. 5 where 605 may represent the information included in the topology database identifying the components/resources included in row 1 152*a*. Each instance of a rack in 605 may include components/resources as further detailed in representation 602.

Element 606 represents that the topology database may identify the components/resources included in each data center (e.g., identify the row(s) in each data center) To further illustrate, reference is made back to FIG. 5 illustrating rows that may be included in a single data center. Element 607 may represent the information in the topology database identifying the components/resources included in the data center. Each instance of a row in 607 may include components/resources as further detailed in representation 604.

Figure 10:
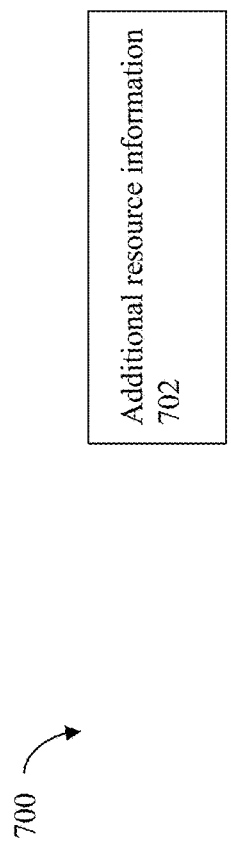

Referring to FIG. 10, shown is a representation of additional resource/component information 702 that may be stored in the topology database 304*a* in an embodiment in accordance with techniques herein. The additional resource/component information 702 may include, for example, information describing the communication interfaces and supported protocols for each resource/component. For example, such additional information 702 may identify one or more interfaces of a compute node communicating using RoCE, iWARP, and the like, as described elsewhere herein. For each switch, such additional information 702 may identify the assigned role (e.g., leaf, spine, border leaf) to the particular switch.

Figure 11:
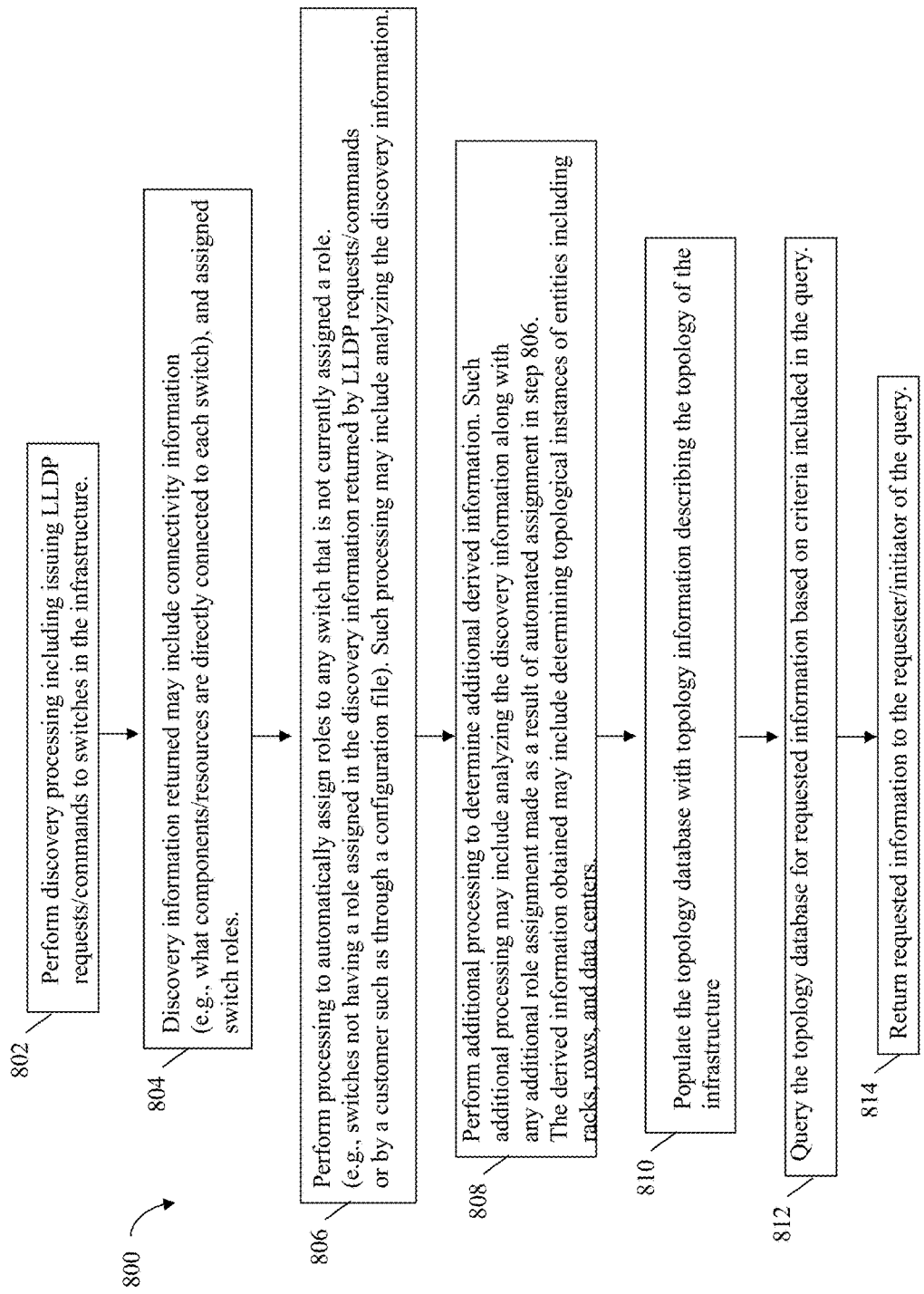
FIG. 11 is a flowchart of processing steps that may be performed in an embodiment in accordance with techniques herein.

Referring to FIG. 11, shown is an example of processing that may be performed in an embodiment in accordance with techniques herein. The flowchart 800 summarizes processing as described above. At step 802, discovery processing may be performed such as by issuing LLDP requests/commands to switches in the infrastructure. At step 804, discovery information may be returned. Such discovery information may include connectivity information (e.g., what components/resources are directly connected to each switch), and assigned switch roles (e.g., via factory presetting, or configuration file). The discovery information may also include property or attribute information about the switch, or a connected resource/component such as regarding the communication interfaces, supported communications protocols, and the like. At step 806, processing may be performed to automatically assign a role to any switch that is not currently assigned a role. For example, a switch may not have been assigned a role in the discovery information returned by LLDP requests/commands or otherwise assigned a role through configuration by a customer. For such switches not currently having assigned roles, processing may be performed to automatically assign roles. For example, techniques are described above such as in connection with FIG. 7 that may be used in connection with programmatically assigning roles to switches. Step 806 processing may include analyzing the discovery information returned in step 804. At step 808, additional processing may be performed to determine additional derived information. Such additional processing may include analyzing the discovery information along with any additional role assignment made as a result of automated assignment in step 806. The derived information obtained may include determining topological instances of entities including instance of racks, rows, and data centers. At step 810, the topology database may be populated with topology information describing the topology of the infrastructure (e.g., connectivity between components/resources, components/resources comprising each of the different topological entities, switch roles, interface information such as supported protocols of the different interfaces of compute nodes, switches). At step 812, a query may be issued to the topology database for requested information based on criteria included in the query. At step 814, the requested information of the query result may be returned to the requester or initiator of the query.

Consistent with discussion herein, the query issued in step 812 may generally be a request for any information in the topology database in accordance with specified criteria of the query used to select relevant information from the topology database. The query may be a request for information, for example, regarding resources/components within a same rack or different racks, regarding what racks are potentially connectable to one another (e.g., directly or indirectly through another rack), and the like. The query may, for example, request information regarding resources/components relative to physical placement or location of such resources/components in the infrastructure.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of creating and using a topology database comprising:
   performing first processing that obtains first information describing a topology of resources of an infrastructure comprising racks, wherein said resources include network resources and other resources connected to the network resources, wherein the network resources include a plurality of switches, and the other resources include compute resources and storage resources connected to the network resources;
   determining, using the first information, sets of the resources included in the racks, wherein each of the sets denotes a portion of the resources included in a different one of the racks, wherein each of the sets includes a pair of the plurality of switches, wherein the pair includes two switches that are leaf switches and each of the two switches of the pair is connected to the other switch of the pair;
   populating the topology database with topology information including the first information and second information, wherein the second information identifies, for each of the racks, a different one of the sets denoting a portion of the resources included in said each rack; and
   querying the topology database.

2. The method of claim 1, wherein a first of the sets denotes a first portion of the resources included in a first rack of the racks, wherein the first set includes a first pair of the plurality of switches, wherein the first pair includes two switches that are leaf switches and each switch of the first pair is connected to the other switch of the first pair, and wherein the first portion of the resources includes any of: at least one compute resource connected to the first pair of the plurality of switches, and at least one storage resource connected to the first pair of the plurality of switches.

3. The method of claim 1, wherein the topology database is included in a topology service and said querying includes issuing a first query to the topology database in accordance with a database interface.

4. The method of claim 3, wherein the first query is issued by a controller to the topology service and the first query includes requesting placement information regarding a physical location of one or more of the resources in the infrastructure.

5. The method of claim 3, wherein the first query includes requesting information including any of: identifying one or more of the resources included in a same one of the racks, and identifying two or more of the resources each in a different one of the racks.

6. The method of claim 1, further comprising:
determining a first portion of the plurality of switches are leaf switches; and
determining a second portion of the plurality of switches are spine switches, wherein said populating includes storing additional information in the topology database denoting each switch of the first portion is a leaf switch and each switch of the second portion is a spine switch.

7. The method of claim 6, wherein said populating includes storing information in the topology database identifying which of the resources are included in a row comprising at least two of the racks, and wherein the topology database denotes that the row includes a first set of the plurality of racks and each rack of the row is connected to each spine switch of the row.

8. The method of claim 7, wherein the topology database denotes that each leaf switch of the row is connected to each spine switch of the row, and denotes that each leaf switch of the row is included in a rack of the first set of the plurality of racks.

9. The method of claim 8, wherein the row is a first row and the topology database denotes that the first row includes a first set of spine switches, the first set of the plurality of racks, and a plurality of border leaf switches, and wherein the topology database denotes that the plurality of border leaf switches are connected to each spine switch of the first set of spine switches and that the plurality of border leaf switches are connected to a second plurality of border leaf switches of a second row including at least two of the racks.

10. The method of claim 9, wherein the topology database denotes a second row including a second set of the plurality of racks and a second set of spine switches, and wherein the topology database denotes that the second plurality of border leaf switches are connected to each spine switch of the second set of spine switches.

11. The method of claim 10, wherein the topology database denotes that the plurality of border leaf switches includes a first pair of border leaf switches and each border leaf switch of the first pair is connected to the other border leaf switch of the first pair, and denotes the second plurality of border leaf switches includes a second pair of border leaf switches and each border leaf switch of the second pair is connected to the other border leaf switch of the second pair.

12. The method of claim 10, wherein the topology database denotes that the first row and the second row are included in a first data center.

13. The method of claim 1, wherein the topology database includes interface information describing communication interfaces of the resources.

14. The method of claim 13, wherein the interface information for a communication interface for a first of the resources includes any of: an internet address of the communication interface of the first resource, a communications protocol used to communicate with the communication interface.

15. The method of claim 1, wherein the first processing includes performing discovery processing and issuing a plurality of commands to the plurality of switches, wherein the plurality of commands request that the plurality of switches return information identifying which of the resources are connected to each of the plurality of switches.

16. A system comprising:
a processor; and
a memory comprising code stored thereon that, when executed, performs a method of creating and using a topology database comprising:
performing first processing that obtains first information describing a topology of resources of an infrastructure comprising racks, wherein said resources include network resources and other resources connected to the network resources, wherein the network resources include a plurality of switches, and the other resources include compute resources and storage resources connected to the network resources;
determining, using the first information, sets of the resources included in the racks, wherein each of the sets denotes a portion of the resources included in a different one of the racks, wherein each of the sets includes a pair of the plurality of switches, wherein the pair includes two switches that are leaf switches and each of the two switches of the pair is connected to the other switch of the pair;
populating the topology database with topology information including the first information and second information, wherein the second information identifies, for each of the racks, a different one of the sets denoting a portion of the resources included in said each rack; and
querying the topology database.

17. A non-transitory computer readable medium comprising code stored thereon that, when executed, performs a method of creating and using a topology database comprising:
performing first processing that obtains first information describing a topology of resources of an infrastructure comprising racks, wherein said resources include network resources and other resources connected to the network resources, wherein the network resources include a plurality of switches, and the other resources include compute resources and storage resources connected to the network resources;
determining, using the first information, sets of the resources included in the racks, wherein each of the sets denotes a portion of the resources included in a different one of the racks, wherein each of the sets includes a pair of the plurality of switches, wherein the pair includes two switches that are leaf switches and each of the two switches of the pair is connected to the other switch of the pair;
populating the topology database with topology information including the first information and second information, wherein the second information identifies, for each of the racks, a different one of the sets denoting a portion of the resources included in said each rack; and
querying the topology database.

18. The non-transitory computer readable medium of claim 17, wherein a first of the sets denotes a first portion of the resources included in a first rack of the racks, wherein the first set includes a first pair of the plurality of switches, wherein the first pair includes two switches that are leaf switches and each switch of the first pair is connected to the other switch of the first pair, and wherein the first portion of the resources includes any of: at least one compute resource connected to the first pair of the plurality of switches, and at least one storage resource connected to the first pair of the plurality of switches.

19. The non-transitory computer readable medium of claim 17, wherein the topology database is included in a topology service and said querying includes issuing a first query to the topology database in accordance with a database interface.

20. The non-transitory computer readable medium of claim 19, wherein the first query is issued by a controller to the topology service and the first query includes requesting placement information regarding a physical location of one or more of the resources in the infrastructure.

* * * * *